United States Patent Office 3,734,874
Patented May 22, 1973

3,734,874
POLYESTERS AND POLYESTERAMIDES CONTAINING ETHER GROUPS AND SULFONATE GROUPS IN THE FORM OF A METALLIC SALT
Charles J. Kibler and Gerald R. Lappin, Kingsport, Tenn., assignors to Eastman Kodak Company, Rochester, N.Y.
No Drawing. Continuation-in-part of application Ser. No. 695,339, Jan. 3, 1968. This application Feb. 27, 1970, Ser. No. 15,193
Int. Cl. C08g 17/06, 20/30
U.S. Cl. 260—29.2 E                40 Claims

ABSTRACT OF THE DISCLOSURE

Water-dissipatable, meltable polyesters and polyesteramides derived from monomer components which include dicarboxylic acid, hydroxycarboxylic acid, aminocarboxylic acid, aminoalcohol, glycol, diamine or combinations of such monomer components wherein at least a part of the total of all such monomer components is a poly(ethylene glycol), and at least a part of said total is one or more of said monomer components substituted with one or more sulfonate metal salt groups. A typical polyester is composed of 80 mole parts of isophthalic acid, 10 mole parts of adipic acid, 10 mole parts of 5-sodiosulfoisophthalate, 20 mole parts of ethylene glycol and 80 mole parts diethylene glycol. Such polymers are useful as adhesives, coating materials, films, packaging materials and other products which can be dissolved, dispersed or otherwise dissipated in cold water, hot water or aqueous solutions.

---

This application is a continuation-in-part of our application Ser. No. 695,339, filed Jan. 3, 1968, now abandoned.

The present invention relates to the preparation and some uses of novel linear, water-dissipatable polymers which are meltable and have good adhesive properties. More particularly, this invention relates to water-dissipatable polyesters and polyesteramides which in one embodiment are prepared by reacting a glycol component, a dicarboxylic acid component, and at least one difunctional comonomer wherein a portion of said comonomer contains a sulfonate group in the form of a metallic salt, said sulfonate group being attached to an aromatic nucleus. Other embodiments are disclosed hereinafter.

The incorporation of extremely low concentrations of alkali metal salts of sulfoisophthalic acid or other sulfoacids into a fiber-forming polyester or the like for the purpose of improving the dyeability of the fiber has been taught in a number of patents. None of these references, however, are concerned with a water-dissipatable polyester or polyesteramides, nor do they teach (1) the preparation of a polymer from a glycol of which at least 15 mole percent is a poly(ethylene glycol), i.e., a poly(oxyethylene glycol), or (2) such a preparation where the total of all components contains at least about 8 mole percent of a poly(ethylene glycol). One of these patents, U.S. 3,018,272, discloses the use of a variety of sulfoacids, including 5-sulfoisophthalic acid. The upper limit of sulfoacid concentration disclosed in this patent, however, is 10 mole percent of the total acid components and the polymers identified therein are not water-dissipatable and do not contain poly(oxyalkylene) glycols. A Japanese patent application No. 12,149/62 (apparently published on Aug. 27, 1962) discloses in a translated English abstract that polyester copolymers are prepared from terephthalic acid, sodium sulfophthalic acid or other sulfo-carboxylic acids, glycols having 2-10 carbon atoms and poly(oxyalkylene glycols); however the sulfo-carboxylic acid component is said to be used in an amount of 1-5 mole percent based on terephthalic acid residues in the copolymer produced, and the illustrated polyoxyethylene glycol has a molecular weight of 4,000 and is used in an amount of 2 parts along with 70 parts of ethylene glycol (mol. wt. of 62); hence, 2 parts represents a very small fraction of one mole percent based on the total glycols used. The resulting polymers clearly lack the characteristics of being water-dissipatable.

According to the present invention, both polyesters and polyesteramides as defined herein have the same characteristic of being water-dissipatable; hence, it is considered most appropriate to cover all these polymers in one specification; however, certain polyesters as subgeneric subject matter are especially advantageous.

In accordance with one aspect of the present invention, a linear, water-dissipatable, meltable polyester or polyesteramide, having an inherent viscosity of at least 0.1 and advantageously (in some cases) at least 0.3, is prepared from a glycol component, a dicarboxylic acid component, and a difunctional monomer component. The components used in the polymer condensation products of this invention are all essentially difunctional which means that they cannot contain other substituents such as isocyanate groups since any such third functional group would mean that the compound was trifunctional. The two functional groups which are present condense to form carbonyloxy or carbonylamido interconnecting groups in the linear molecular structure. The glycol component of the invention advantageously comprises at least about 15 mole percent of at least one poly(ethylene glycol( having the formula:

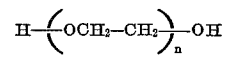

wherein $n$ is 2 to about 20.

More especially, this invention provides a linear, water-dissipatable polymer having carbonyloxy interconnecting groups in the linear molecular structure wherein up to 80% thereof may be carbonylamido linking groups, said polymer having an inherent viscosity of at least about 0.1 measured in a 60/40 parts by weight solution of phenol/tetrachloroethane at 25° C. and at a concentration of about 0.25 gram of polymer in 100 ml. of said solvent, said polymer consisting essentially of at least (a), (b) and (c) from the following components:

(a) At least one difunctional dicarboxylic acid;
(b) At least one difunctional glycol containing two —CR$_2$—OH groups of which at least 15 mole percent is a poly(ethylene glycol) having the structural formula:

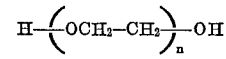

$n$ being an integer in the range between about 2 and about 20;

(c) An amount sufficient to provide said water-dissipatable characteristic of said polymer of at least one difunctional sulfo-monomer containing at least one metal sulfonate group attached to an aromatic nucleus wherein the functional groups are hydroxy, carboxyl or amino; and (d) From none to an amount of a difunctional hydroxycarboxylic acid having one —CR$_2$—OH group, an aminocarboxylic acid having one —NRH group, an amino--alcohol having one —CR$_2$—OH group and one —NRH group, a diamine having two —NRH groups, or a mixture thereof, wherein each R is an H atom or a 1-4 carbon alkyl group, said components (a), (b), (c) and (d) being organic compounds, each of which contains a hydrocarbon moiety which has from none up to six nonfunctional groups, and where (A) represents all of the carboxy functional groups in said polymer from all of said components and (B) represents all of the functional hydroxy and functional amino groups in said polymer from all of said components, the ratio of said (A) to (B) in said polymer is substantially unity, whereby said polymer is essentially linear. Acording to one aspect of this invention, there is provided a polymer which is a polyester wherein said difunctional sulfo-monomer is a dicarboxylic acid and constitutes about 8 mole percent to about 50 mole percent based on the sum of (1) the moles of the total dicarboxylic acid content of components (a) and (b), and (2) one half of the moles of any hydroxycarboxylic acid content from said component (d).

According to more specific embodiments, such polyesters are provided wherein said difunctional sulfo-monomer (c) is a glycol and constitutes about 8 mole percent to about 50 mole percent based on the sum of (1) the total glycol content measured in moles of (b) and (c), and (2) one half of the moles of any hydroxycarboxylic acid content from said component (d).

The aforesaid range is most preferably from about 10 up to about 50 mole percent.

Examples of suitable poly(ethylene glycols) include diethylene glycol, triethylene glycol, tetraethylene glycol, and pentaethylene, hexaethylene, heptaethylene, octaethylene, nonaethylene, and decaethylene glycols, and mixtures thereof. Preferably the poly(ethylene glycol) employed in the polyesters or polyesteramides of the present invention is diethylene glycol or triethylene glycol or mixtures thereof. The remaining portion of the glycol component may consist of aliphatic, alicyclic, and aralkyl glycols. Examples of these glycols include ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol. Copolymers may be prepared from two or more of the above glycols.

The dicarboxylic acid component of the polyester or polyesteramide comprises aliphatic dicarboxylic acids, alicyclic dicarboxylic acids, aromatic dicarboxylic acids, or mixtures of two or more of these acids. Examples of such dicarboxylic acids include oxalic; malonic; dimethylmalonic; succinic; glutaric; adipic; trimethyladipic; pimelic; 2,2-dimethylglutaric; azelaic; sebacic; fumaric; maleic; itaconic; 1,3-cyclopentanedicarboxylic; 1,2-cyclohexanedicarboxylic; 1,3-cyclohexanedicarboxylic; 1,4-cyclohexanedicarboxylic; phthalic; terephthalic; isophthalic; 2,5-norbornanedicarboxylic; 1,4-naphthalic; diphenic; 4,4'-oxydibenzoic; diglycolic; thiodipropionic; 4,4'-sulfonyldibenzoic; and 2,5-naphthalenedicarboxylic acids. If terephthalic acid is used as the dicarboxylic acid component of the polyester, superior results are achieved when at least 5 mole percent of one of the other acids listed above is also used.

It should be understood that use of the corresponding acid anhydrides, esters, and acid chlorides of these acids is included in the term "dicarboxylic acid." Examples of these esters include dimethyl 1,4-cyclohexanedicarboxylate; dimethyl 2,6-naphthalenedicarboxylate; dibutyl 4,4'-sulfonyldibenzoate; dimethyl isophthalate; dimethyl terephthalate; and diphenyl terephthalate. Copolyesters may be prepared from two or more of the above dicarboxylic acids or derivatives thereof.

The difunctional sulfo-monomer component of the polyester or polyesteramide may advantageously be a dicarboxylic acid or an ester thereof containing a metal sulfonate group or a glycol containing a metal sulfonate group or a hydroxy acid containing metal sulfonate group. The metal ion of the sulfonate salt may be $Na^+$, $Li^+$, $K^+$, $Mg^{++}$, $Ca^{++}$, $Cu^{++}$, $Ni^{++}$, $Fe^{++}$, $Fe^{+++}$ and the like. When a monovalent alkali metal ion is used the resulting polyesters or polyesteramides are less readily dissipated by cold water and more readily dissipated by hot water. When a divalent or a trivalent metal ion is used the resulting polyesters or polyesteramides are not ordinarily easily dissipated by cold water but are more readily dissipated in hot water. Depending on the end use of the polymer, either of the different sets of properties may be desirable. It is possible to prepare the polyester or polyesteramide using, for example, a sodium sulfonate salt and later by ion-exchange replace this ion with a different ion, for example, calcium, and thus alter the characteristics of the polymer. In general, this procedure is superior to preparing the polymer with divalent metal salt inasmuch as the sodium salts are usually more soluble in the polymer manufacturing components than are the divalent metal salts. Polymers containing divalent or trivalent metal ions are less elastic and rubber-like than polymers containing monovalent ions. The difunctional monomer component may also be referred to as a difunctional sulfo-monomer and is further described hereinbelow.

Advantageous difunctional components which are aminoalcohols include aromatic, aliphatic, heterocyclic and other types as in regard to component (d). Specific examples include 5-aminopentanol-1, 4-aminomethylcyclohexanemethanol, 5-amino-2-ethyl-pentanol-1, 2-(4-β-hydroxyethoxyphenyl)-1-aminoethane, 3-amino-2,2-dimethylpropanol, hydroxyethylamine, etc. Generally these aminoalcohols contain from 2 to 20 carbon atoms, one —NRH group and one —$CR_2$—OH group.

Advantageous difunctional monomer components which are aminocarboxylic acids include aromatic aliphatic, heterocyclic, and other types as in regard to component (d) and include lactams. Specific examples include 6-aminocaproic acid, its lactam known as caprolactam, omega-aminoundecanoic acid, 3-amino-2-dimethylpropionic acid, 4-(β-aminoethyl)benzoic acid, 2-(β-aminopropoxy)benzoic acid, 4-aminomethylcyclohexanecarboxylic acid, 2 - (β - aminopropoxy)cyclohexanecarboxylic acid, etc. Generally these compounds contain from 2 to 20 carbon atoms.

Advantageous examples of difunctional monomer component (d) which are diamines include ethylenediamine; hexamethylenediamine; 2,2,4-trimethylhexamethylenediamine; 4-oxaheptane-1,7-diamine; 4,7-dioxadecane-1,10-diamine; 1,4 - cyclohexanebismethylamine; 1,3 - cycloheptamethylenediamine; dodecamethylenediamine, etc.

Advantageous difunctional sulfo-monomer components are those wherein the sulfonate salt group is attached to an aromatic acid nucleus such as a benzene, naphthalene, diphenyl, oxydiphenyl, sulfonyldiphenyl, or methylenediphenyl nucleus. Preferred results are obtained through the use of sulfophthalic acid, sulfoterephthalic acid, sulfoisophthalic acid, 4 - sulfonaphthalene-2,7 - dicarboxylic acid, and their esters; metallosulfoaryl sulfonate (as described in Lappin, Kibler, Gilmer, and Jones U.S. patent application Ser. No. 695,349, entitled "New Organic Compounds and Basic-Dyeable Polyesters Containing Same," filed Jan. 3, 1968) having the general formula:

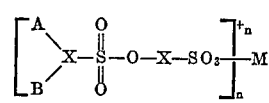

wherein X is a trivalent aromatic radical derived from a substituted or unsubstituted aromatic hydrocarbon, Y is a divalent aromatic radical derived from a substituted or unsubstituted aromatic hydrocarbon, A and B are carboalkoxy groups containing 1 to 4 carbon atoms in the alkyl portion or a carboxy group, M is $Li^+$, $Na^+$, $K^+$, $Mg^{++}$, $Ca^{++}$, $Cu^{++}$, $Fe^{++}$, $Fe^{+++}$, and $n$ is 1 for monovalent M or 2 for divalent M. The preceding sulfomonomer compounds may be prepared as shown by the following general reactions which are exemplified in the examples below:

(I) 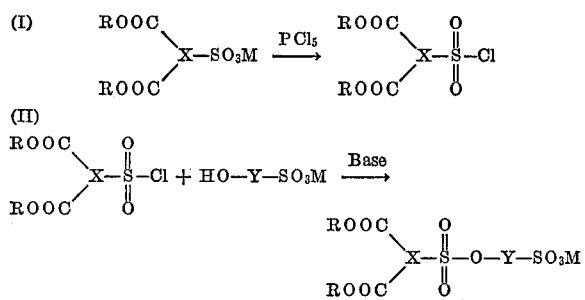

(II)

Many variations of these reactions may be employed. For example, the sulfonyl chloride intermediate may be prepared from either the sulfonic acid or a salt thereof, and other chlorinating agents (e.g., thionyl chloride, phosphorus trichloride, phosphorous oxychloride) may be used. In addition, the reaction between the sulfonyl chloride and the sulfophenol may be carried out in water or an inert organic solvent, and the base used may be an alkali metal hydroxide or a tertiary amine.

Examples of preferred modifiers include:

(A) 4-sodiosulfophenyl-3,5-dicarbomethoxybenzenesulfonate
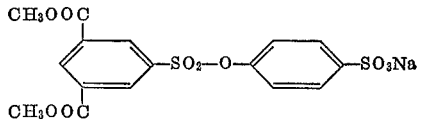

(B) 4-Lithiosulfophenyl-3,5-dicarbomethoxybenzenesulfonate
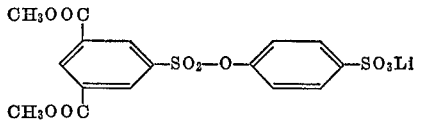

(C) 4-sodiosulfo-2,6-dimethylphenyl-3,5-dicarbomethoxy-benzenesulfonate
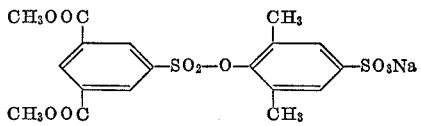

(D) 4-sodiosulfo-2,6-dipropylphenyl-3,5-dicarbomethoxy-benzenesulfonate
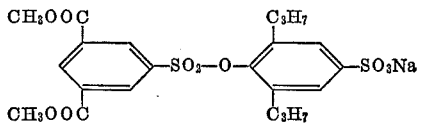

(E) 4-sodiosulfo-1-naphthyl-3,5-dicarbomethoxy-benzenesulfonate
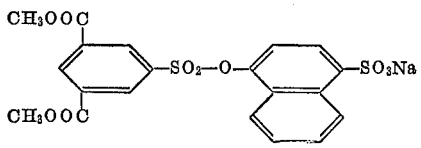

(F) 5-sodiosulfo-1-naphthyl-3,5-dicarbomethoxy-benzenesulfonate
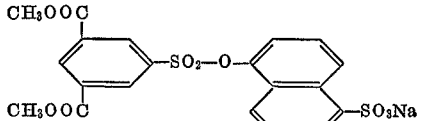

(G) sodiosulfo-1-naphthyl-3,5-dicarbomethoxy-benzenesulfonate
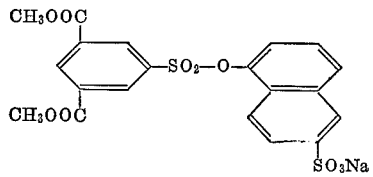

(H) 4-sodiosulfophenyl-3,5-dicarbethoxybenzenesulfonate
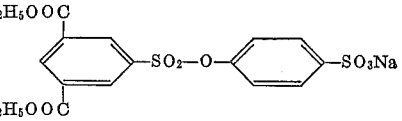

(I) sodiosulfophenyl-3,5-dicarbopropoxybenzenesulfonate
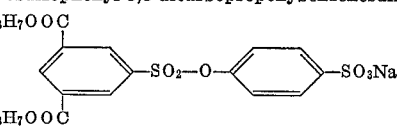

(J) sodiosulfophenyl-3,5-dicarbobutoxybenzenesulfonate
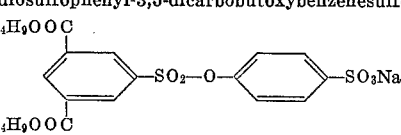

(K) 3-sodiosulfophenyl-3,5-dicarbomethoxybenzenesulfonate
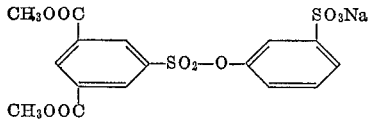

(L) 4-sodiosulfophenyl-3,5-dicarboxybenzenesulfonate
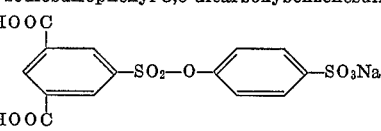

(M) 4-sodiosulfophenyl-3,4-dicarbomethoxybenzenesulfonate
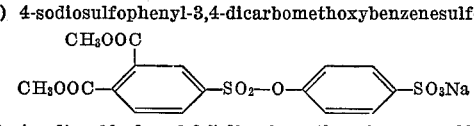

(N) 4-sodiosulfophenyl-2,5-dicarbomethoxybenzenesulfonate
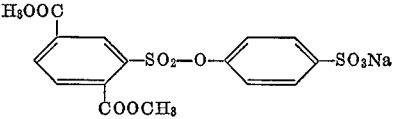

(O) 2-sodiosulfophenyl-3,5-dicarbomethoxybenzenesulfonate
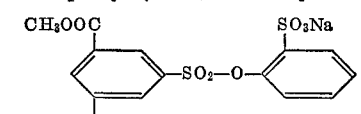

(P) 4-potassiosulfophenyl-3,5-dicarbomethoxybenzenesulfonate
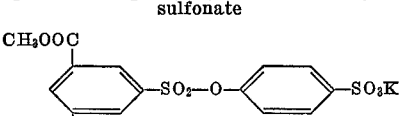

(Q) 7-sodiosulfo-1-naphthyl-3,5-dicarbomethoxybenzenesulfonate
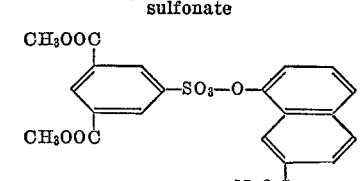

(R) 8-sodiosulfo-1-naphthyl-3,5-dicarbomethoxybenzene-sulfonate

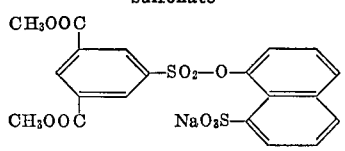

(S) 6-sodiosulfo-2-naphthyl-3,5-dicarbomethoxybenzene-sulfonate

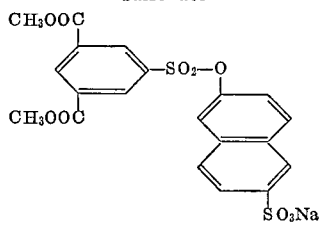

In the new organic compounds of said invention, the two function groups on the trivalent radical X may be in any positional relationship to each other and to the metallic sulfonate group.

Other advantageous sulfo-monomer components include alkali metal salts of a sulfodiphenyl ether dicarboxylic acid or its ester as described in Lappin et al., U.S. patent application Ser. No. 671,565, filed Sept. 29, 1967, now abandoned and substituted by streamlined continuation Ser. No. 835,295, which was published Nov. 18, 1969 as a Defensive Publication, 868 O.G. 730. These compounds have the general formula:

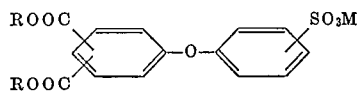

wherein R is hydrogen, an alkyl group of 1 to 8 carbon atoms (for example, methyl, ethyl, n-propyl, isopropyl, n-butyl, isobutyl, t-butyl, n-pentyl, n-hexyl, n-heptyl, n-octyl, etc.), or phenyl, and M is $Na^+$, $Li^+$, $K^+$, $Mg^{++}$, $Ca^{++}$, $Cu^{++}$, $Fe^{++}$, $Fe^{+++}$, etc.

Particularly superior results are achieved when the difunction sulfo-monomer component is 5-sodiosulfoisophthalic acid or its esters.

Examples of difunctional sulfo-monomer components which are hydroxycarboxylic acid derivatives or glycol derivatives and which may be included in component (c) are illustrated by the following formulas:

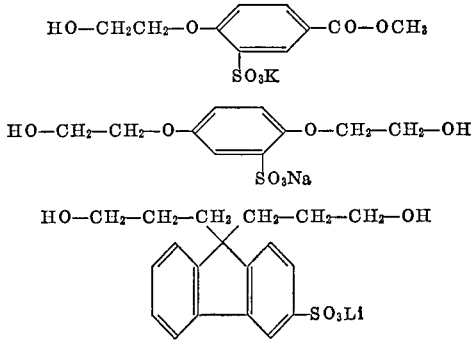

Another illustrative example of component (c) has the following formula:

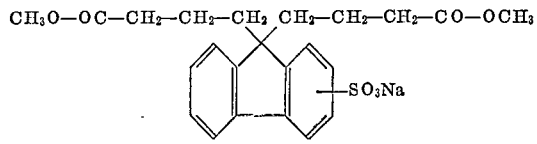

When the sulfonate-containing difunctional monomer is an acid or its ester, the polyester or polyesteramide should contain at least 8 mole percent of said monomer based on total acid content, with more than 10 mole percent giving particularly advantageous results. Total acid content is calculated as the sum of (1) moles of component (a) namely, dicarboxylic acids, (2) one half of the moles of carboxyl-containing compounds of component (d), (3) moles of component (c) which are dicarboxylic acids, and (4) one half of the moles of component (c) which are monocarboxy-containing compounds.

When the difunctional sulfo-monomer is a glycol containing a metal sulfonate group, the polyester or polyesteramide should contain at least 8 mole percent of the sulfo-monomer based on total hydroxy content and any amino content from a monomer component, with more than 10 mole percent giving particularly advantageous results. Total hydroxy and amino content from monomer components obviously excludes the oxy atoms internally present in the poly(ethylene glycol) and is calculated as the sum of (1) moles of component (b), (2) one half of the moles of any carboxyl-containing compounds of component (d), (3) any moles of component (d) which are amino-alcohols and diamines, (4) one half of the moles of component (c) which are mono-hydroxy or mono-amino containing compounds, and (5) moles of component (c) which are dihydroxy, diamino and aminohydroxy compounds.

Greater dissipatability is achieved when the difunctional sulfo-monomer constitutes from about 6 mole percent to about 25 mole percent out of a total of 200 mole percent of (a), (b), (c) and any (d) components of the polyester or polyesteramide. The total of 200 mole percent is explained below and can also be referred to as 200 mole parts.

Any of the above-identified difunctional monomers generally contain hydrocarbon moieties having from 1 to about 40 carbon atoms in addition to their two functional groups, but they may in general also contain up to six non-functional groups such as —O—, —S—, —$SO_2$—, —$SO_2$—O—, etc. Of course, the poly(ethylene glycol) monomer used may contain from 1 to about 19 oxy groups, namely —O— groups.

By changing the proportions of the various acids which make up the dicarboxylic acid component of the polyester or polyesteramide, the properties of the polymer may be varied to meet specific end uses. Therefore, as the proportion of terephthalic acid is decreased, the polymer becomes more flexible. Thus, wide ranges of softening point and flexibility can be obtained by varying the proportions of the various acids employed as the dicarboxylic acid component. Moreover, varying the mole percentages of sulfonate-containing difunctional monomer varies the water susceptibility of the polymer. In addition, the mixture of dissipated polymer and aqueous solution is unexpectedly stable, thus demonstrating the hydrolytic stability of the polymer. Furthermore, essentially no hydrolysis of the polymer occurs during three months storage at room temperature in water and even at 50° C. in water the polymer resists hydrolytic degradation for several days.

To obtain the modified polymers of this invention, the sulfonate-containing difunctional monomer modifier may be added directly to the reaction mixture from which the polymer is made, Thus, these monomer modifiers can be used as a component in the original polymer reaction mixture. Other various processes which may be employed in preparing the novel polymers of this invention are well known in the art and are illustrated in such patents as U.S. 2,465,319; 3,018,272; 2,901,466; 3,075,952; 3,033,-822; 3,033,826 and 3,033,827. These patents illustrate interchange reactions as well as polymerization or build-up processes.

Whenever the term "inherent viscosity" (I.V.) is used in this description, it will be understood to refer to viscosity determinations made at 25° C. using 0.25 gram of polymer per 100 ml. of a solvent composed of 60 percent phenol and 40 percent tetrachloroethane as parts by weight. In addition, whenever the terms "dissipatable," "dissipated" or "dissipate," are used in this description, it will be understood to refer to the activity of a water, aqueous or caustic aqueous solution on the polymer. The terms are specifically intended to cover those situations wherein the solution dissolves and/or disperses the polyester or polyesteramide therein and/or therethrough. Furthermore, whenever the word "water" is used in this description, it includes not only aqueous solutions but also hot aqueous solutions and caustic aqueous solutions.

The polyesters and polyesteramides of this application have particular utility in the paper-using industry as a hot-melt adhesive which will dissipate in aqueous or caustic aqueous solutions. In many operations using paper products, it is advantageous to use a hot-melt adhesive for various sealing or fastening operations as, for example, in making paper bags or in book binding. Such operations produce a significant amount of scrap paper which can be recovered by repulping and adding this pulp back in the paper-making process. Conventional hot-melt adhesive are not affected by the hot alkaline solutions used in repulping and seriously interfere with successful recovery of paper scrap.

The present invention, however, provides hot-melt adhesives which are dissolved or dispersed by hot aqueous solutions, and, therefore, do not interfere with the repulping process. Many other uses exist for such a water dissipatable hot-melt adhesive. In addition, the present polyesters and polyesteramides have utility as hot-melt adhesives for paper, cloth, polyester film and other substrates. Because of their water dissipatability, the polymers of this invention have many uses not open to ordinary hot-melt adhesives. For example, it is possible to apply a water solution of the polymer to a substrate, allow the water to evaporate leaving an adherent coating of the polymer on the substrate. At some later time a bond can be formed by application of heat and pressure. Another application of this invention involves water-soluble films which are used for packaging detergents, dry bleach, and such products. With the use of the present polyester or polyesteramide, it is possible to put package and all in a washing machine whereupon the package disintegrates readily in hot water but is relatively unaffected by moisture at ordinary temperatures. Films of the present water-soluble polymer, particularly those in which the metal ion is $Mg^{++}$ or $Ca^{++}$, have such properties and are useful for this application. There are many applications for a surface coating material which can be easily applied to give a tough adherent protective coating which can later be easily removed. These new polymers have properties which make them useful for this purpose. Other uses for the polymers of this invention include uses for film splicing.

Additional uses are disclosed in Shields, Hawkins and Wooten U.S. Pat. 3,456,008 entitled "Sizing Compositions and Fibrous Articles Sized Therewith."

This invention will be further illustrated by the following examples. The percentages are by weight unless otherwise specified.

EXAMPLE 1

A mixture of (a–1) 48.5 g. (0.25 mole) of dimethyl isophthalate, (a–2) 24.2 g. (0.125 mole) of dimethyl terephthalate, (a–3) 15 g. (0.075 mole) of hexahydroisophthalic acid, (c) 14.8 g. (0.05 mole) of dimethyl 5-sodiosulfoisophthalate, (b) 68.9 g. (0.65 mole) of diethylene glycol, 0.8 ml. of a 21% catalyst solution of titanium isopropoxide and 0.41 g. (0.005 mole) of sodium acetate as a buffer. This mixture is stirred and heated at 200° C. for 2 hours. Note that components (a–1), (a–2) and (c) are dicarboxylic acid components (total of 0.500 mole or 100 mole percent based on such acid components), and note further that the glycol component (b) in excess of 0.5 mole is reduced to an amount which is essentially 0.5 mole in the final condensation product. The temperature is then raised to 275° C. and a vacuum of 0.3 mm. is applied. Heating and stirring is continued for 1 hour under these conditions. After cooling, the polymer obtained has an I.V. of 0.53 and is tough and rubbery. It is dissipated in hot water to the extent of about 20 wt. percent to give a clear, slightly viscous solution. After storage of the solution for three months at room temperature, the water is evaporated from a portion. The residual polymer has an I.V. of 0.54. No measurable hydrolysis has occurred.

EXAMPLE 2

The following table shows the properties of a number of polyesters made from sulfonate-containing difunctional monomers. All are made as in Example 1. Although it is possible to prepare polymers as in Example 1 without sodium acetate or a similar buffer, preparation is advantageously performed in the presence of such a buffer used in an amount of about 0.01% to 1% by weight of all of the components. Such buffers include sodium acetate, potassium acetate, calcium acetate, etc. Polymers B, L and M are included for comparative purposes only. The mole percent figures in Table I are either for the dicarboxylic acid on the one hand or the glycol (DEG, EG, etc.) on the other hand. In both cases the mole percent adds up to 100% and the overall condensation product (100 mole percent acid plus 100 mole percent glycol) is the desired polymer. Of course, as in Example 1, the reaction is ordinarily carried out with an excess of the more volatile component which is usually the glycol, e.g., in Example 1 the reaction involves 0.500 mole (100 mole percent) of dicarboxylic acid components and 0.65 mole of glycol, of which the condensation product contains 0.5 mole (100 mole percent) of said glycol; hence, the total overall mole percent of components is 200 mole percent which could be also called mole parts or proportions, i.e. 200 mole parts overall.

TABLE I

Example 2.—Polyester made with sulfonate-containing monomers

| Polymer | Dicarboxylic acid | Mole, percent | Sulfonate | Mole, percent | Glycol | Mole, percent | I.V. | Effect of hot water |
|---|---|---|---|---|---|---|---|---|
| A | Isophthalic<br>Terephthalic<br>Hexahydroisophthalic | 52.5<br>25<br>15 | SIP [1] | 7.5 | DEG [2] | 100 | 0.54 | Slight dissipation. |
| B | Isophthalic<br>Terephthalic<br>Hexahydroisophthalic | 60<br>25<br>15 | SIP | 10 | 1,6-hexanediol | 100 | 0.50 | No dissipation. |
| C | Terephthalic | 90 | SIP | 10 | DEG | 100 | 0.51 | Slight dissipation. |
| D | Isophthalic | 90 | SIP | 10 | DEG | 100 | 0.53 | Dissipates. |
| E | Hexahydroterephthalic | 90 | SIP | 10 | DEG | 100 | 0.73 | Do. |
| F | Isophthalic<br>Terephthalic<br>Hexahydroisophthalic | 50<br>25<br>15 | SIP | 10 | DEG<br>EG [3] | 80<br>20 | 0.60 | Do. |
| G | Isophthalic<br>Terephthalic<br>Hexahydroisophthalic | 50<br>25<br>15 | (4) | 10 | DEG | 100 | 0.42 | Do. |
| H | Isophthalic | 90 | (5) | 10 | DEG | 100 | 0.48 | Do. |
| I | Isophthalic<br>Hexahydroterephthalic | 60<br>30 | (6) | 10 | DEG | 100 | 0.55 | Do. |
| J | Isophthalic | 90 | (6) | 10 | DEG | 100 | 0.42 | Do. |
| K | Terephthalic | 92 | SIP | 8 | TEG [7] | 100 | 0.33 | Do. |
| L | Isophthalic | 98 | SIP | 2 | TEG | 100 | 0.55 | No dissipation. |
| M | do | 96 | SIP | 4 | TEG | 100 | 0.45 | Do. |

See footnotes at end of table.

TABLE I—Continued

| Polymer | Dicarboxylic acid | Mole, percent | Sulfonate | Mole, percent | Glycol | Mole, percent | I.V. | Effect of hot water |
|---|---|---|---|---|---|---|---|---|
| N | do | 94 | SIP | 6 | TEG[7] | 100 | 0.42 | Slight dissipation. |
| O | do | 92 | SIP | 8 | TEG | 100 | 0.59 | Dissipates. |
| P | do | 90 | SIP | 10 | CHDM[8] / DEG | 30 / 70 | 0.45 | Do. |
| Q | Adipic | 90 | SIP | 10 | DEG | 100 | 0.69 | Do. |
| R | Isophthalic | 90 | SIP | 10 | CHDM / DEG | 50 / 50 | 0.48 | Slight dissipation. |
| S | do | 90 | SIP | 10 | CHDM / DEG | 60 / 40 | 0.51 | Do. |
| T | do | 80 | SIP | 20 | CHDM / DEG | 70 / 30 | 0.32 | Dissipates. |
| U | do | 80 | SIP | 20 | CHDM / DEG | 60 / 40 | 0.38 | Do. |
| V | Isophthalic / Terephthalic / Adipic | 50 / 15 / 15 | SIP | 20 | DEG / EG | 80 / 20 | 0.15 | Do. |
| W | Isophthalic / Hexahydroisophthalic | 50 / 35 | (9) | 15 | DEG | 100 | 0.45 | Do. |
| X | Isophthalic | 100 | (10) | 15 | DEG | 100 | 0.58 | Do. |
| Y | do | 100 | (11) | 15 | DEG | 100 | 0.31 | Do. |

[1] SIP = 5-sodiosulfoisophthalic acid.
[2] DEG = Diethylene glycol.
[3] EG = Ethylene glycol.
[4] 4-sodiosulfophenyl 3,5-dicarboxybenzene sulfonate.

[5] 5(p-sodiosulfophenoxy)isophthalic acid, 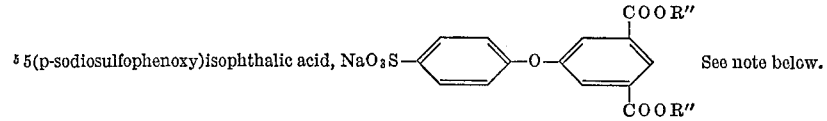 See note below.

[6] 2(2'-sodiosulfophenyl)-2-ethylmalonic acid, 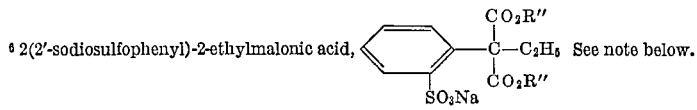 See note below.

[7] TEG = Triethylene glycol.
[8] CHDM = 1,4-cyclohexanedimethanol (70% trans/30% cis isomers; other ratios produce similar polyesters).

[9] 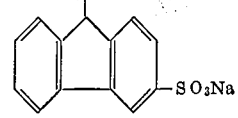

[10] 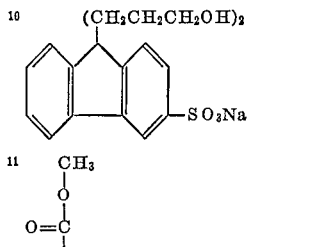

[11]
$$CH_3$$
$$|$$
$$O$$
$$|$$
$$O=C$$
$$|$$
$$CH-CH_2-CH_2-CH_2-SO_3Na$$
$$|$$
$$O=C$$
$$|$$
$$O$$
$$|$$
$$CH_3$$

NOTE.—Each R'' is an H atom or a 1–4 carbon alkyl group and is eliminated during the preparation of the polymers of this invention.

EXAMPLE 3

Use of water-dissipatable polyester as a hot-melt adhesive for paper

A lap joint between two pieces of heavy kraft paper is made by placing between them a film cast from a water solution of polymer of Example 1 and then pressing with a hot iron. When this bond is broken, either in shear or peel, the paper fails rather than the adhesive. When the bonded paper is boiled with water for 10 min. the bond is completely destroyed and the polyester is dissipated.

EXAMPLE 4

Use of water-dissipatable polyester as a coating and a hot-melt adhesive for poly(ethylene terephthalate) film Poly(ethylene terephthalate) film, 10 mils thick, is coated with a water solution of the polymer of Example 1. After drying, a clear, tough, transparent strongly adherent coating is obtained. When two such pieces of coated film are pressed together with a hot iron, a strong bond results. The excess coating extruding from between the region of contact is removed when the film is washed with a spray of hot water. This illustrates the use of these materials as easily removable adhesives for film splicing.

EXAMPLE 5

Use of water-dissipatable polyester as a packaging film

A film is cast from a water solution of Polymer D of Example 2. It is clear, tough, and somewhat rubbery. A pouch is formed from this film, filled with a solid detergent, and heat-sealed. This package is dropped into vigorously stirred hot water. The package rapidly disintegrates releasing its contents.

EXAMPLE 6

Modification of water-dissipatable polyester by replacement of sodium ion

A film cast from the polymer of Example I is swelled by soaking in water at 25° C. The water is then replaced with 10% aqueous solution of calcium chloride. The film rapidly shrinks to its original size. It is no longer swelled by cold water but is still dissipatable in hot water. In a similar fashion, the sodium ion is replaced with $Cu^{++}$, $Mg^{++}$, $Ni^{++}$, $Fe^{++}$ and $Fe^{+++}$. In each case, the film is rendered non-swelling in cold water but is still dissipatable in hot water.

The foregoing disclosure clearly describes advantageous embodiments of this invention which includes a linear, water-dissipatable polyester, having an inherent viscosity of at least about 0.1 and generally at least about 0.3, derived from at least one difunctional dicarboxylic acid; at least one glycol of which at least 15 mole percent is a poly(ethylene glycol) having the structural formula

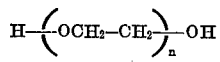

$n$ being an integer of about 2 to about 20; and a difunctional sulfo-monomer containing a metal sulfonate group attached to an aromatic nucleus.

The foregoing disclosure is illustrative of a more broad definition of this invention which covers a linear, water-dissipatable polyester of polyesteramide of components as described hereinabove wherein the overall total of said components comprises at least 10 mole percent of at least one or a mixture of said poly(ethylene glycols) and at least 4 mole percent of at least one or a mixture of said difunctional sulfomonomer components, said percentages being based on the sum of the moles of all components.

These linear polyesters or polyesteramides are derived from monomer components which can be more specifically identified as dicarboxylic acid, hydroxycarboxylic acid, aminocarboxylic acid, aminoalcohol, glycol and/or diamine, including combinations of these components.

In other words, one aspect of this invention provides a linear, water-dissipatable polyester or polyesteramide derived from at least two difunctional monomer components which are dicarboxylic acid, hydroxycarboxylic acid having one —$CR_2$—OH group, aminocarboxylic acid, aminoalcohol having one —$CR_2$—OH and one —NRH group, glycol having two —$CH_2$—OH group, and diamine components having two —NRH groups, including combinations thereof wherein the overall total moles of said components comprises at least 7.5 mole percent of at least one or a mixture of poly(ethylene glycols) containing from 2 to 20 ethylene groups and at least 4 mole percent of at least one or a mixture of difunctional sulfo-monomers containing at least one metal sulfonate group attached to an aromatic nucleus, said nucleus being present in at least one of the aforesaid monomer components.

More especially, another aspect of this invention provides a linear, water-dissipatable polyester, having an inherent viscosity of at least about 0.1, measured in a 60/40 parts by weight solution of phenol/tetrachloroethane at 25° C. and at a concentration of 0.25 gram of polyester in 100 ml. of said solvent, said polyester consisting essentially of the following components:

(I) At least one difunctional glycol containing two —$CR_2$—OH groups of which at least 15 mole percent is a poly(ethylene glycol) having the structural formula:

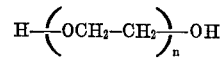

$n$ being an integer of about 2 to about 20; and (II) At least one difunctional dicarboxylic acid of which from about 8 mole percent to about 50 mole percent is a difunctional sulfo-monomer consisting essentially of an aromatic dicarboxylic acid containing a metal sulfonate group attached to an aromatic nucleus.

An especially useful linear polyester of the aforesaid definition is the condensation product of the following monomer components:

(1) At least one difunctional dicarboxylic acid component, (2) A hydroxy component which is at least one difunctional glycol containing two —$CR_2$—OH groups, a hydroxycarboxylic acid containing one —$CR_2$—OH group or combination thereof, (3) At least one sulfo-monomer component which is included as a part of component (1), component (2), or a combination of components (1) and (2), (4) At least one poly(ethylene glycol) component having the following structural formula:

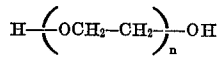

wherein $n$ is an integer in the range of 2 to about 20, component (4) being as at least about 20 mole percent of the sum of (i) the moles of said glycol and (ii) one half of the moles of said hydroxycarboxylic acid, the ratio of hydroxy to carboxy groups in the total of all monomer components being substantially unity in the condensation product, i.e. the polyester produced.

The following Table II illustrates such polyesters which are prepared essentially as described in Example 1 above. The mole percentages given for the dicarboxylic acid component when combined with the percentage for the SIP component and half of the percentage for the hydroxycarboxylic acid component will give a total which will be 50 mole percent of all components, and the percentages given for the glycol component when similarly combined with one half of the percentage for the hydroxycarboxylic acid will give a total which will be 50 mole percent. The condensation of the components represented by these two 50 mole percent sums produces the desired polyester which could also be defined in terms of mole parts rather than mole percent wherein all of the components taken together add up to 100 mole parts in the condensation products, i.e. the polyester which is produced. It is noted that this method of measuring mole percentages and mole parts is not the same as that used elsewhere in this specification. The important point to observe is that the ratios elsewhere identified in this specification will be essentially unity in the condensation polymers being produced.

Table II illustrates polymers of this invention wherein the inherent viscosity is at least about 0.3, the percentage of poly(ethylene glycol) in component (b) is at least about 20%, said $n$ is an integer in the range from 2 to about 10 and each R is an H atom, methyl, ethyl, a propyl isomer or a butyl isomer.

TABLE II

| Polymer | Dicarboxylic acid (mole percent of all monomers) | Hydroxycarboxylic acid (mole percent of all monomers) | Sulfomonomer (mole percent of all monomers) | Glycol (mole percent of all monomers) | I.V. | Effect of hot water |
|---------|--------------------------------------------------|-------------------------------------------------------|---------------------------------------------|---------------------------------------|------|---------------------|
| AA | Terephthalic (32.5) | 6-hydroxyhexanoic (25) | SIP (5) | DEG (37.5) | 0.75 | Dissipates. |
| BB | Isophthalic | do | SIP (5) | DEG (37.5) | 0.60 | Do. |
| CC | Isophathlic (27.5) | 4-hydroxymethylcyclohexanecarboxylic (25). | SIP (10) | DEG (20); EG (17.5) | 0.42 | Do. |
| DD | Sebacic | 6-hydroxyhexanoic (25) | SIP (7.5) | DEG (17.5); 1,6-hexanediol (20). | 1.09 | Do. |
| EE | Terephthalic (10); isophthalic (15) | 6-hydroxyhexanoic (35) | SIP (7.5) | DEG (32.5) | 0.45 | Do. |
| FF | Hexahydroterephthalic (32.5) | Hydroxypivalic (25) | SIP (5) | DEG (37.5) | 0.72 | Do. |

The polyesteramides according to one aspect of this invention are set forth in a more general form hereinabove. More particularly this invention provides such a polymer which is a polyesteramide having about 20 to about 97% carbonyloxy interconnecting groups and, conversely, about 80 to about 3% carbonylamido interconnecting units in the linear molecular structure, the latter being from said amino compounds or a mixture thereof contained in said component (d).

More specifically such polymers are those wherein said difunctional sulfo-monomer (c) is derived from a dicarboxylic acid and constitutes about 8 mole percent to about 50 mole percent based on the carboxyl content, i.e., the sum of (1) the moles of component (a), (2) one half of the moles of any hydroxycarboxylic acid and any aminocarboxylic acid, or mixture thereof contained in said component (d), and (3) the moles of component (c).

In another more specific embodiment such polymers are those wherein said sulfo-monomer (c) is a glycol and constitutes about 8 mole percent to about 50 mole percent based on the hydroxy and amino content, i.e., the sum of (1) the total glycol content measured in moles of (b) and (c), (2) one half of the moles of any hydroxycarboxylic acid or aminocarboxylic acid content from said component (d), and (3) moles of any amino-alcohol or moles of any diamine content from said component (d).

In another more specific embodiment such polymers are those wherein said sulfo-monomer (c) is a glycol and constitutes about 8 mole percent to about 50 mole percent based on the hydroxy and amino content, i.e., the sum of (1) the total glycol content measured in moles of (b) and (c), (2) one half of the moles of any hydroxycarboxylic acid or aminocarboxylic acid content from said component (d), and (3) moles of any amino-alcohol or moles of any diamine content from said component (d).

In another more specific embodiment such polymers are those wherein said sulfo-monomer (c) is present in more than 10 mole percent to about 50 mole percent based on said sum of (1), (2) and (3).

The following examples provide more specific illustrations of the polyesteramide embodiments of this invention although the processes illustrated are essentially those well known in the art as described in patents: U.S. 2,901,466; U.S. 3,033,822; U.S. 3,033,826 and U.S. 3,033,827, the process descriptions of which are incorporated herein by reference.

EXAMPLE 7

Polyesteramide from 80 mole percent isophthalate/20 mole percent 5-sodiosulfoisophthalate esters and 40 mole percent diethylene glycol/60 mole percent hexamethylenediamine The following reactants are placed in a 100 ml. single neck flask: 15.5 g. (0.08 m.) of dimethyl isophthalate, 6.0 g. (0.02 m.) of dimethyl 5-sodiosulfoisophthalate, 8.5 g. (0.08 m.) of diethylene glycol, 7.0 g. (0.06 m.) of 1,6-hexanediamine and 15 ml. of water. The flask is fitted with a metal stirrer and a head having a nitrogen inlet tube and an outlet for downward distillation. The flask is heated in a metal bath for 7 hrs. at 90–95° C. under nitrogen. The temperature is raised to 120° C. for 1 hr. and finally to 150° C. for 0.5 hr. The mixture is cooled to room temperature and 0.028 g. dibutyl tin diacetate is added as a catalyst to increase molecular weight. The flask is again placed in a metal bath at 200° C. and the temperature is raised to 270° C. The reaction mixture is heated under vacuum at 270° C. for 1.5 hrs. The final polymer has an I.V. of 0.17 and it is dissipatable in water at room temperature.

Other polyesteramide compositions as set forth in Table III are prepared by a similar procedure.

EXAMPLE 8

Polyesteramide from 60 mole percent caprolactam/40 mole percent 5-sodiosulfoisophthalate ester and 100 mole percent diethylene glycol.

The polyesteramide is prepared as above from 21.0 g. (0.16 m.) epsilon-aminocaprolactam, 12.0 g. (0.04 m.) of dimethyl 5-sodiosulfoisophthalate, 2.1 g. (0.04 m.) diethylene glycol and 2 ml. of water. The polymer has an I.V. of 0.13 and is dissipatable in hot water (80° C.).

EXAMPLE 9

The following Table III shows properties of a number of polyesteramides which are made as in Examples 7 and 8. All of the polymers of Table III are made with the designated dicarboxylic acids and the table shows the mole percent of the acids including 5-sodiosulfoisophthalic acid which is employed in an amount such that the total of dicarboxylic acids is 100 mole percent. The mole percentages of diethylene glycol (DEG) and diamine also add up to 100 mole percent.

The diamines set forth in Table III are 1,4-cyclohexanebismethylamine in its essentially trans isomeric form (CHBMA), 1,6-diamino-2,2-trimethylhexane (DATMH), hexamethylene-diamine (HMDA) and 1,10-diamino-4,7-dioxadecane (DADOD).

TABLE III

Polyesteramides with sulfonate-containing monomers

| Polymer | Dicarboxylic acid | Mole, percent | Mole, percent SIP | Mole, percent DEG | Diamine | Mole, percent | I.V. | $T_g$, ° C. | $T_m$, ° C. | Effect of hot water |
|---|---|---|---|---|---|---|---|---|---|---|
| 1 | Terephthalic | 80 | 20 | 50 | CHBMA | 50 | 0.20 | 127 | Not detected | Slight dissipation. |
| 2 | Isophthalic | 80 | 20 | 50 | CHBMA | 50 | 0.14 | 120 | 196 (weak) | Dissipates. |
| 3 | do | 90 | 10 | 50 | CHBMA | 50 | 0.17 | 100 | Not detected | Slight dissipation. |
| 4 | Azelaic | 80 | 20 | 50 | CHBMA | 50 | 0.75 | 30 | do | Do. |
| 5 | Isophthalic | 80 | 20 | 40 | CHBMA | 60 | 0.19 | Not detected to −10° C. | 191; 222 (weak) | Do. |
| 6 | Terephthalic | 80 | 20 | 60 | CHBMA | 40 | 0.15 | 101 | Not detected | Dissipates. |
| 7 | do | 90 | 10 | 60 | CHBMA | 40 | 0.18 | 77 | do | No dissipation. |
| 8 | Isophthalic | 90 | 10 | 60 | CHBMA | 40 | 0.16 | 65 | do | Slight dissipation. |
| 9 | Azelaic | 90 | 10 | 60 | CHBMA | 40 | 0.37 | 89 | do | No dissipation. |
| 10 | do | 80 | 20 | 60 | CHBMA | 40 | 0.21 | Not detected | do | Do. |
| 11 | do | 80 | 20 | 70 | CHBMA | 30 | 0.26 | | | Dissipates. |
| 12 | Terephthalic | 80 | 20 | 50 | HMDA | 50 | 0.18 | Not detected to −10° C. | 116; 142 | Slight dissipation. |
| 13 | Isophthalic | 80 | 20 | 50 | HMDA | 50 | 0.15 | 59 | 168 | Dissipates. |
| 14 | Azelaic | 80 | 20 | 50 | HMDA | 50 | 0.31 | Not detected to −10° C. | 70; 129 | Do. |
| 15 | Isophthalic | 80 | 20 | 40 | HMDA | 60 | 0.17 | do | 119; 123; 184 | Do. |
| 16 | do | 90 | 10 | 60 | HMDA | 40 | 0.20 | 67 | Not detected | Do. |
| 17 | do | 90 | 10 | 40 | HMDA | 60 | 0.20 | 79 | 155 | Slight dissipation. |
| 18 | do | 90 | 10 | 30 | HMDA | 70 | 0.20 | 89 | Not detected | Do. |
| 19 | do | 80 | 20 | 30 | HMDA | 70 | 0.18 | 120 | do | Dissipates. |
| 20 | Azelaic | 80 | 20 | 40 | HMDA | 60 | 0.32 | Not detected | 139 | No dissipation. |
| 21 | do | 80 | 20 | 50 | HMDA | 50 | 0.28 | do | 57; 118; 125 | Slight dissipation. |
| 22 | do | 90 | 10 | 60 | HMDA | 40 | 0.47 | | | Dissipates. |
| 23 | Terephthalic | 80 | 20 | 50 | DATMH | 50 | 0.15 | Not detected to −10° C. | 122; 152; 164; 182 | Do. |
| 24 | do | 90 | 10 | 50 | DATMH | 50 | 0.18 | 82 | Not detected | Slight dissipation. |
| 25 | Isophthalic | 80 | 20 | 50 | DATMH | 50 | 0.15 | 69 | 149; 158 | Do. |
| 26 | Azelaic | 80 | 20 | 50 | DATMH | 50 | 0.33 | 5 | Not detected | Dissipates. |
| 27 | Terephthalic | 80 | 20 | 50 | DATMH | 50 | 0.18 | Not detected to −39° C. | 120 | Do. |
| 28 | Isophthalic | 80 | 20 | 40 | DATMH | 60 | 0.13 | 84 | Not detected | Do. |
| 89 | Azelaic | 80 | 20 | 40 | DATMH | 60 | 0.28 | −7 | 174 | Do. |

TABLE III—Continued

| Polymer | Dicarboxylic acid | Mole, percent | Mole, percent SIP | Mole, percent DEG | Diamine | Mole, percent | I.V. | $Tg$, °C. | $Tm$, °C. | Effect of hot water |
|---|---|---|---|---|---|---|---|---|---|---|
| 30 | do | 90 | 10 | 40 | DATMH | 60 | 0.34 | −13 | 167 | No dissipation. |
| 31 | do | 90 | 10 | 50 | DATMH | 50 | 0.28 | | | Dissipates. |
| 32 | Terephthalic | 80 | 20 | 50 | DADOD | 50 | 0.12 | 61 | Not detected | Do. |
| 33 | do | 90 | 10 | 50 | DODAD | 50 | 0.20 | 55 | do | Do. |
| 34 | Isophthalic | 80 | 20 | 50 | DADOD | 50 | 0.16 | 47 | 114; 156 | Do. |
| 35 | do | 90 | 10 | 50 | DADOD | 50 | 0.17 | 46 | Not detected | Do. |
| 36 | Azelaic | 80 | 20 | 50 | DADOD | 50 | 0.27 | Not detected to −10° C. | 53; 75 | Do. |
| 37 | do | 90 | 10 | 50 | DADOD | 50 | 0.51 | Not detected to −15° C. | 69 | Do. |
| 38 | Isophthalic | 80 | 20 | 40 | DADOD | 60 | 0.15 | 59 | 116 | Do. |
| 39 | do | 80 | 20 | 30 | DADOD | 70 | 0.17 | 39 | Not detected | Do. |
| 40 | do | 80 | 20 | 20 | DADOD | 80 | 0.17 | 51 | do | Do. |
| 41 | Azelaic | 80 | 20 | 20 | DADOD | 80 | 0.34 | −4 | 54; 100 | Do. |
| 42 | do | 90 | 10 | 20 | DADOD | 80 | 0.48 | −14 | 113; 118 | No dissipation. |
| 43 | do | 90 | 10 | 30 | DADOD | 70 | 0.50 | | | Dissipates. |

The abbreviations or symbols for the diamines are given above. $Tg$ is the glass transition temperature determined by scanning the polymers at increasing temperatures using a Perkin-Elmer Differential Scanning Calorimeter (DSC) Model 1-B. $Tm$ is the melting temperature measured in degrees centigrade on the same instrument. The expression "Not Detected" means that the DSC showed no detectable endotherm which would characterize "melting temperature" or no detectable base line shift which would characterize "glass transition temperature." Several values for $Tm$ means that several endotherms were detected.

Polymers in Table III numbered 7, 9, 10, 20, 30 and 42 may not be illustrative of what is claimed by the present invention because these polymers were not readily dissipatable in water having the temperature indicated above when no caustic was present. However, the data and description in this disclosure in its entirely make it readily apparent to those having ordinary skill in the art how to prepare similar polymers which will, in general, be dissipatable in hot or cold water or in alkaline aqueous solutions.

Additional data is given in Table IV. This data, along with the data given hereinabove, provides information for preparing a very extensive variety of dissipatable polymers having a wide range of properties. This specification as a whole makes it quite clear that it is readily feasible to prepare water dissipatable polymers having specific properties according to any particularly desired end use as described hereinabove.

In Table IV, "N.D." means "not detected" as explained above in regard to Table III.

TABLE IV

Characteristics and properties of dissipatable polyesters wherein the sulfo-monomer is SIP and the sole glycol is DEG

| Polymer | Dicarboxylic acid (mole percent of sum of dicarboxylic acid in this column and SIP) | Mole percent SIP | Polymer properties | | | Properties of pressed film | | | | | |
|---|---|---|---|---|---|---|---|---|---|---|---|
| | | | | | | Tensile properties | | | | | |
| | | | I.V. | $Tg$, °C. | $Tm$, °C. | Yield, p.s.i. ×10³ | Break, p.s.i. ×10³ | Percent elongation | Durometer hardness at 23° C. | Appearance of pressed film | |
| 1 | Isophthalic (90) | 10 | 0.43 | 25 | N.D. | 1.3 | 1.2 | 227 | 72 | Hard. | |
| 2 | Terephthalic (90) | 10 | 0.39 | 25 | 171 | 1.0 | 800 | 272 | 63 | Do. | |
| 3 | Isophthalic (80) | 20 | 0.37 | 33 | N.D. | 4.9 | 4.3 | 42 | 78 | Do. | |
| 4 | Adipic (90) | 10 | 0.39 | −50 | N.D. | 38 | 20 | 28 | 10 | Soft; sticky. | |
| 5 | Hexahydroisophthalic (80) | 20 | 0.34 | −8 | N.D. | (*) | 560 | 360 | 31 | Flexible. | |
| 6 | Adipic (42.5); isophthalic (42.5) | 15 | 0.37 | −17 | 144 | 110 | 80 | 933 | 20 | Soft; flexible. | |
| 7 | Hexahydroisophthalic (42.5); isophthalic (42.5) | 15 | 0.41 | 4 | N.D. | (*) | 830 | 566 | 44 | Flexible. | |
| 8 | Terephthalic (42.5); isophthalic (42.5) | 15 | 0.35 | −28 | 191 | 1.9 | 1.5 | 150 | 74 | Hard; brittle. | |
| 9 | Hexahydroisophthalic (42.5); Adipic (42.5) | 15 | 0.38 | −33 | N.D. | 90 | 50 | 286 | 18 | Flexible. | |
| 10 | Terephthalic (42.5); adipic (42.5) | 15 | 0.35 | −17 | 147 | 110 | 50 | 901 | 18 | Do. | |
| 11 | Hexahydroisophthalic (28.34); adipic (28.33); isophthalic (28.33). | 15 | 0.37 | −13 | N.D. | 140 | 50 | 1369 | 20 | Do. | |
| 12 | Terephthalic (28.34); adipic (28.33); isophthalic (28.33) | 15 | 0.34 | −8 | N.D. | 140 | 350 | 828 | 25 | Do. | |
| 13 | Hexahydroisophthalic (90) | 10 | 0.42 | −13 | N.D. | 80 | 50 | 108 | 16 | Soft; sticky. | |
| 14 | Hexahydroisophthalic (80) | 20 | 0.20 | −11 | N.D. | (*) | 400 | 405 | 30 | Flexible. | |
| 15 | Terephthalic (28.34); hexahydroisophthalic (28.33); isophthalic (28.33). | 15 | 0.35 | 11 | N.D. | (*) | 830 | 355 | 55 | Do. | |
| 16 | Terephthalic (28.34); hexahydroisophthalic (28.33); adipic (28.33). | 15 | 0.33 | −14 | 176 | 90 | 140 | 390 | 18 | Do. | |
| 17 | Terephthalic (21.25); hexahydroisophthalic (21.25); adipic (21.25); isophthalic (21.25). | 15 | 0.31 | −11 | N.D. | (*) | 430 | 588 | 38 | Do. | |
| 18 | Isophthalic (90) | 10 | 0.26 | 29 | N.D. | 460 | 730 | 343 | 68 | Hard. | |
| 19 | Adipic (90) | 10 | 0.25 | −52 | N.D. | | | | 8 | Soft; sticky. | |
| 20 | Hexahydroisophthalic (90) | 10 | 0.25 | −20 | 173 | | | | 11 | Do. | |
| 21 | Terephthalic (80%) | 20 | 0.26 | 22 | N.D. | 500 | 390 | 377 | 58 | Hard. | |
| 22 | do | 20 | 0.20 | 20 | N.D. | (*) | 410 | 4 | 70 | Do. | |
| 23 | Adipic (80) | 20 | 0.20 | −46 | 186 | 35 | 20 | 30 | 16 | Soft; sticky. | |
| 24 | Terephthalic (22.5); hexahydroisophthalic (22.5); adipic (22.5); isophthalic (22.5). | 10 | 0.43 | −9 | 134 | 100 | 85 | 759 | 12 | Sticky. | |
| 25 | Terephthalic (42.5); hexahydroisophthalic (42.5) | 15 | 0.36 | 4 | N.D. | (*) | 590 | 520 | 38 | Flexible. | |
| 26 | Adipic (80) | 20 | 0.27 | −45 | N.D. | 146 | 70 | 51 | 13 | Soft; sticky. | |
| 27 | Terephthalic (20); hexahydroisophthalic (20); adipic (20); isophthalic (20). | 20 | 0.27 | −14 | 183 | 176 | 75 | 286 | 30 | Flexible. | |

*The tensile yield measurement was not considered significant.

It is readily apparent that this invention includes the polymers as defined when dissipated in water whether the water be (1) hot, (2) cold, (3) alkaline aqueous solutions, or any other aqueous media including organic or inorganic solutes, organic liquids, organic dyes, pigments, stabilizers or other additives, any of which substances may be present therein for the purpose of contributing to the intended end use. When the expression "hot water" is used, it means water at about 80°–90° C. unless otherwise set forth. When the only liquid present is water, the water-dissipated polymer generally contains 0.1 to 55% by weight of polymer based on the sum of the polymer and water; advantageous ranges for various end uses include 10 to 40% polymer, especially 20 to 35% polymer, etc. However, when other substances are also present, these percentage ranges may be considerably different.

USING AQUEOUS POLYMER BLENDS WITH OTHER SUBSTANCES

Various general as well as specific end uses for the polymers of this invention have been described hereinabove. Many desirable end uses may be achieved, as found by coworkers in our same laboratories, by altering the physical properties of the polymers of this invention by providing blends of these polymers with water and other substances, some of which have been referred to above in a more or less specific manner. When used for certain particular purposes, the polymers of this invention which have been dissipated in water have certain properties which may diminish their most effective utilization. For instance, certain of the polymers of this invention have excellent adhesion on polyester fibers when used as a sizing agent, but tend to be sticky or tacky and may thereby cause difficulty in textile processing operations. In such cases, it is desirable to reduce the tackiness of the coating and at the same time retain good adhesion on the fiber. In other instances, the polymers of this invention have excellent adhesion on substrates but are not sufficiently tacky to provide the maximum obtainable contact adhesion and in such cases it is desirable to increase the surface tackiness and still retain the good adhesive properties on the substrate.

Therefore, the polymers of this invention may be blended with certain other substances which are compatible with the polymers of this invention for the intended end use, whereby the blended composition forms transparent films or coatings having improved characteristics. In other instances, added substances may be used which increase the hardness and reduce the tackiness of the polymers of this invention. In still further instances, other added substances have the opposite effect. It is thus apparent that added substances may be employed which provide methods for imparting a wide range of useful supplemental characteristics so as to further enhance the utilization of the present invention to its more extensive advantage.

The results obtained by our coworkers show that in general, these advantageous aqueous compositions containing the polymers of the present invention comprise the following ingredients (A), (B) and (C):

(A) From about 5–96 weight percent of at least one polymer according to the present invention, said percent being based on the sum of ingredients (A) and (B), (B) From about 95–4 weight percent of a substance selected from the group generally consisting of the following substances, said percent being based on the sum of ingredients (A) and (B):

(1) starch (modified or natural form),
(2) carbohydrate plant gum,
(3) protein,
(4) a polymer containing amide groups,
(5) poly(vinyl alcohol),
(6) partially hydrolyzed poly(vinyl acetate),
(7) an addition polymer containing a carboxyl group,
(8) carboxymethyl cellulose,
(9) poly(alkene ether), etc.

(C) Water in an amount whereby said ingredient (A) is present in an amount of about 0.1 to about 55% based on the sum of said water and ingredient (A).

The preceding weight percentages of ingredient (B) can in some instances be more advantageously from 10–50 weight percent or in some instances, 10–30%. According to this additional disclosure of utility, it is further noted that the amount of the sulfo-monomer component (c) which is present in the polymers of this invention to facilitate enhancing the water-dissipatable characteristic may be increased or decreased depending upon those other substances which may be present so as to enhance said characteristic. Moreover, the presence of other components in the polymers of this invention will also constitute a factor affecting this characteristic as well as other characteristics, for example, whether the polymer includes poly(ethylene glycols) containing two, four, six, ten, fifteen or other numbers of ethyleneoxy groups may affect the overall characteristics of the aqueous composition. In addition, the presence of component (b) in the polymer of this invention which is a glycol having branched chain or alicyclic structure may also affect various characteristics, such glycols being represented by 2-methyl-1,4-butanediol, 2,2,4,4-tetramethyl-1,3-cyclobutanediol, 1,4-cyclohexanedimethanol, 1,2-propylene glycol, 2,3-butylene glycol, etc. The poly(ethylene glycol) may also be substituted or supplemented in some instances by glycols wherein $n$ has a greater value than 20 such as having a value up to 30 although when the value of $n$ is greater than 20 it must be determined whether the increased value will adversely affect an especially desired characteristic even though there may be an offsetting factor due to some other additive substance such as a surfactant as illustrated by sorbitan monolaurate mixed with ethylene oxide, or the like.

The blends of the polymers of this invention and the other substances which have been mentioned above can be prepared at various temperatures and under a wide variety of conditions depending upon the characteristics of the polymers of the invention which are being employed as well as the other substances which are being blended. For instance, a polymer of the invention can be dissipated in water and this can then be mixed with the other substance or with a solution or suspension of the other substance or substances.

Examples of the other substances mentioned hereinabove include starch, modified starch, degraded starch, natural starch, and other forms of starch derived from corn starch, potato starch and include acid-hydrolyzed starch, dextrins and the like. Carbohydrates plant gums include the gum arabic, gum tragacanth, alginic acid, etc. Among the many proteins which can be employed are gelatin, casein, soybean protein, animal blood protein, etc. A great variety of addition type polymers can be employed, especially those containing amine groups which are represented by homopolymers and copolymers of acrylamides, methacrylamides, fumaramides and other amide derivatives of $\alpha,\beta$-unsaturated carboxylic acids. The nitrogen atom of the amide group may contain one or two lower alkyl radicals as substituents. Typical examples are polyacrylamide, polymethacrylamide, poly(N-methylmethacrylamide) and poly(N,N-dimethylacrylamide). Other addition type polymers include poly (vinyl alcohol) or partially hydrolyzed poly(vinyl acetate) containing up to about 30 mole percent or more of acetyl groups. Other related polymers and copolymers can be used. Further examples of addition polymers include those which contain carboxyl groups and these polymers are typically represented by homopolymers and copolymers of acrylic acid, methacrylic acid, fumaric acid, maleic acid, itaconic acid and citraconic acid. Typical examples are poly(acrylic acid), poly(methacrylic acid), copolymers of styrene and maleic acid, copolymers of methyl vinyl ether and maleic acid, copolymers of styrene and itaconic acid, etc. Carboxylated polymers may be used in the free acid form or as the alkali metal or amine salt. Further substances which may be employed are carboxymethyl cellulose polymers and derivatives. These polymers may be used as the alkali metal or amine salts. Other additive substances include poly(alkylene ethers) as mentioned hereinbefore with particular care that the substances of this nature do not have a molecular weight sufficiently high to interfere with the water-dissipatable characteristic of the overall liquid aqueous composition. A molecular weight of about 3000 is normally considered about maximum although in some instances higher molecular weights might be used depending upon the other substances which may be present. It is noted that these poly(alkylene ethers) are additives and are not considered in the sense of being one of the components of the polymers of the invention. Segmented or block type copolymer additive substances may be used which contain alternating segments of poly(ethylene glycol) and poly(propylene glycol) units. This type is available commercially under the trade name "Pluronic," manufactured by Wyandotte Chemicals Corporation.

The uses of the polymers of this invention in blends with other substances contain from about 5% to 96% of the polymers of this invention based on the combined weight of the polymers of this invention and the other substances, excluding water.

More specific uses are illustrated by selecting a particular polymer in accordance with this invention such as that described hereinabove derived from components (a), (b) and (c) wherein component (a) is isophthalic acid, component (b) is diethylene glycol, and component (c) is sodium 5-sulfoisophthalate, the polymer having I.V. of about 0.6. This polymer of the present invention is hereinafter referred to as Polymer X. Although Polymer X has many useful purposes some properties can be further enhanced, as mentioned hereinabove, where it is desired to reduce its normal slightly tacky characteristics such as when the polymer is used as a size for fibers which might in some cases tend to adhere to each other when wound on a beam. Moreover, such sized fibers might in some cases tend to stick to guides, reeds and other objects encountered during textile processing. The specific Polymer X mentioned hereinabove and the water-dissipated compositions, including Polymer X, may have one or more of their characteristics altered by blending with substances including those mentioned hereinabove in order to increase the hardness and reduce the surface tack of the films and coatings thereby obtained as follows:

(a) Four parts of Polymer X and one part of poly(vinyl alcohol) are dissolved (dissipated) in 95 parts of water. The solution is poured onto a glass plate and the water is evaporated. The resulting film has a smooth, non-tacky surface. Pieces of the film, when pressed together, do not stick or block, whereas unmodified Polymer X films adhere strongly when the surfaces are contacted. The blend has excellent adhesion on polyester, nylon and acrylic fibers. The sized fibers have essentially no tendency to adhere to each other when wound on a beam. There is essentially no tendency to stick on guides and reeds during processing.

(b) A blend of four parts Polymer X and one part gelatin is prepared as described above. Films and coatings made from the blends have a non-tacky surface and are considerably harder than those made from Polymer X alone. The blends are valuable as sizing agents for polyester, nylon, acrylic and cellulose ester fibers.

(c) A blend of four parts Polymer X and one part poly(acrylic acid is prepared as described above. Films cast from the water solution are clear and hard, with a non-tacky surface. The films show no tendency to adhere or block when pressed together. This blend is valuable as a size for polyester, nylon, acrylic and cellulose acetate fibers.

(d) A blend of four parts Polymer X and one part sodium carboxymethyl cellulose is prepared as described above. Films and coatings made from the blend have a non-tacky surface. Polyester fibers sized with the blend have good processing properties. The coating has excellent adhesion on the fiber and is not removed by contact with guides or reeds. The size is readily removed from the woven fabrics by standard boil-off procedures.

(e) A blend of four parts Polymer X and one part poly(N-isopropylacrylamide) is prepared in water. Films and coatings made from the blend are non-tacky. Although the films are somewhat harder than Polymer X per se, they are not brittle. This blend is valuable as a size for polyester, nylon, acrylic, glass and cellulose ester fibers.

(f) A blend of four parts Polymer X and one part soluble corn starch is prepared. The composition is useful as a size on synthetic fibers because it has good adhesion and provides a smooth, low-friction surface.

All of the blends described above are readily removed from the fibers by standard scouring procedures.

The blends are useful for producing a smooth, hard finish on paper. The finish imparts good printing properties.

The polymers of this invention, such as illustrated by Polymer X, may be improved by blending with certain water-soluble polymeric substances in order to increase the tackiness and improve the adhesive properties.

(g) A blend of four parts Polymer X and one part Carbowax 6000 is prepared in water. Carbowax 6000 is a poly(ethylene glycol) sold by Union Carbide Chemical Co. It has the structure $H(OCH_2CH_2)_nOH$ where $n$ is about 150. Films and coatings made from this solution are soft and sticky. They have a high degree of surface tack and make excellent contact adhesives. They have excellent adhesion on glass, metals, plastics, paper, wood, cellulose esters and ceramics. The solution is coated on cellophane tape to give a layer 1 mil thick when dry. This tape adheres to a variety of substrates when used as a contact adhesive. Similar results are obtained when a tape made from poly(ethylene terephthalate) is used. A coating of the blend is applied on glass bottles and the water is evaporated. Paper labels are applied on the coated bottles, using a high speed processing machine. The labels have excellent adhesion but can be removed by soaking for a few minutes in water.

(h) A blend is made from four parts of Polymer X and one part of Pluronic L-64 by dissolving in water. Pluronic L-64 is a segmented poly(ethylene oxidepropylene oxide) copolymer manufactured by Wyandotte Co. The blend forms a tough, sticky film or coating that has excellent adhesion on metals, glass, wood, paper and plastics. It is valuable as a contact adhesive. The coatings are readily soluble in water. This property is important when it is desired to remove labels, masking tapes, protective coatings, etc.

Blends of additional polymers of this invention such as can be identified as Polymer Y are made as listed below, said Polymer Y being harder and having less surface tack than said Polymer X. These blends include water in a manner analogous to that described above; the abbreviation "pt." means parts by weight:

(i) 50 pt. polymer Y+50 pt. soluble starch;
(j) 95 pt. polymer Y+5 pt. styrene-maleic acid copolymer, sodium salt;
(k) 70 pt. polymer Y+30 pt. casein;
(l) 70 pt. polymer Y+30 pt. gum arabic;
(m) 85 pt. polymer Y+15 pt. polyacrylamide.

The compositions are useful as sizing agents for textile fibers and as coating agents for paper. Films and coatings are readily removed by soaking in water.

White, opaque coatings are obtained by incorporating 1 to 10% of a pigment such as $TiO_2$, clay or $CaCO_3$.

The polymers of this invention can be converted into a useful contact adhesive by incorporating 10 to 30% of Carbowax 2000, Carbowax 4000 or Pluronic L-43, which are similar to those of g and h above. The tackiness of the polymers of this invention are also improved by incorporating 5 to 35% of poly(ethylene oxide) derivatives having the structure

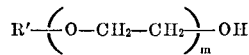

where R' is a hydrocarbon radical containing from 6 to 20 carbon atoms and $m$ is 10 to 60.

Other polymers of this invention including polyesters and polyesteramides may be used in a manner similar to the use of Polymer X and Polymer Y. Such uses include coating on tire cord as previously mentioned above.

The foregoing discussion of utility concerning the polymers of this invention has been concerned to a considerable degree with blends with substances wherein the blends (excluding water) contain 50% or more of the polymers of the invention. Other uses may employ blends containing 5 to 50% of the polymers of the invention whereby the relatively small amount thereof will impart valuable adhesive properties to a wide variety of polymeric substances. The discovery of enhanced adhesion by coworkers in our laboratories provided by such small percentages, especially 15% to 30% of the polymers of this invention, when blended with substances such as starch, gelatin, natural gums and other water-dissipatable substances which normally have poor adhesion on hydrophobic substrates, was unexpected. Normally, small amounts such as 15 to 30% of the blend polymer of the invention, along with the other substances, based on the total weight of the solids (excluding water), would not be expected to have a high degree of adhesion on polyester fibers and other hydrophobic fibers, including vinyl chloride, polymeric fibers and fibers derived from vinylidene chloride, etc. In fact, in many instances percentages as little as 5% will provide satisfactory and quite unexpected results in regard to such adhesion.

The following additional illustrations of utility describe aqueous compositions including the previously identified Polymer X; these illustrations particularly pertain to the use of small proportions of Polymer X for improving adhesion of starch and other water-soluble substances as follows:

(n) Four parts of hydroxyethyl starch, one part of the Polymer X, and one part of glycerol are dissolved in 50 parts of water. The glycerol is added as a plasticizer. The solution is applied as a thin layer on drafted poly(ethylene terephthalate) film. After evaporation of the water, a clear coating is formed. The coating has excellent adhesion on the film. Hydroxyethyl starch containing the same amount of glycerol but no Polymer X has poor adhesion on the film. This blend of Polymer X, hydroxyethyl starch, and glycerol is useful as a textile size for hydrophobic fibers such as polyesters, nylon, poly(vinyl chloride), and cellulose triacetate. Blends containing only 5% Polymer X show improved adhesion on the hydrophobic fibers.

(o) Ninety parts of thin-boiling starch and 10 parts of Polymer X are dissolved in 300 parts of water. Coatings are made from the solution on glass, polyester film, paper, steel, and aluminum. The coatings have good adhesion. When 15 parts of glycerol is added, the composition is useful as textile size for polyester, nylon, and cellulose acetate fibers.

(p) An aqueous blend of 20 parts Polymer X and 80 parts gelatin has good adhesion on glass, metals, and polyester film. The blend can be plasticized with glycerol, trimethylolpropane, sorbitol, or diethylene glycol.

(q) An aqueous blend fo 15 parts Polymer X and 85 parts poly(vinyl alcohol) has good adhesion on glass, polyester film, metals and ceramics.

(r) The adhesion of aqueous compositions containing gum arabic and alginic acid is improved by blending with 5–25% of Polymer X. For example, 10 g. of gum arabic and 1 g. of Polymer X are dissolved in 25 cc. of water and the solution is coated on glass. After evaporation of the water, the coating has excellent adhesion. The coating becomes tacky when moistened and is useful for attaching labels to the glass. Gum arabic alone tends to flake off from the glass.

(s) One part of Polymer X and 9 parts of hydroxyethyl starch are dissolved in 60 parts of water. The mixture is used as a textile size. The adhesion is excellent on polyester and nylon fibers. The flexibility of the coating is improved by using from 1 to 3 parts of glycerol or triethylene glycol as plasticizer.

(t) Two parts of Polymer X and 8 parts of soluble starch are dissolved in 50 parts of water. The composition is useful as a textile size.

(u) One part of Polymer X and 2 parts of gelatin are dissolved in 100 parts of water. Coatings made from the solution have good adhesion on polyester films.

(v) One part of Polymer X and 4 parts of poly(N-isopropylacrylamide) are dissolved in 30 parts of water. Coatings made on glass and polyester film have good adhesion.

USE IN BLENDS OF ELASTOMERIC STAPLE AND NORMAL STAPLE

Another advantageous utility of the present invention which has been discovered by coworkers in our laboratories involves improving the preparation of elastomeric yarns from blends of elastomeric staple and normal relatively inelastic staple of other fibers which can be characterized as "inelastic or hard." Such blended elastomeric yarns containing from about 5 to about 30% by weight of elastomeric staple and 95 to 70% by weight of inelastic staple are known to be useful in the preparation of stretch fabrics and may be spun on conventional spinning equipment. However, our coworkers have found that the polymers of the present invention are especially advantageous when an aqueous composition containing one or more of these water-dissipatable polymers is used as a size or coating primarily for the elastomeric staple which is normally cut from previously coated or sized continuous filaments. The inelastic staple may or may not be sized or coated. The elastomeric staple can be prepared from fibers of well-known spandex elastomeric fibers such as those described in U.S. 3,261,812; U.S. 2,929,804; U.S. 2,957,852; U.S. 3,023,192; Brit. 1,118,731; Brit. 1,118,-732, etc. The inelastic staple can be prepared from well-known fibers of polyesters, polyamides, polyacrylates, cellulose esters, etc. as well as natural fibers such as wool, cotton, silk, etc. U.S. Pat. 3,077,006 describes the preparation of blended elastomeric staple and inelastic staple whereby elastic yarn prepared from the blend can be obtained. Other references include U.S. 3,007,227 and U.S. 3,325,876.

By using as sizing or coating compositions the aqueous compositions of the present invention which include the polymers of this invention and may include other substances, difficulties encountered in blending, carding, and spinning yarns are greatly reduced whereby high quality yarn can be prepared and the yarn then washed with water so as to remove the sizing or coating composition. The washed yarn is of greatly improved quality. Of course, in some instances the size or coating may be left on yarn until after it has been formed into a fabric, and then washed in the usual manner.

In the absence of the above-mentioned coating or sizing, the elastomeric portion of the staple blend tends to become stretched and breakage occurs in many instances; moreover, in the staple blend as the elastomeric portion of the staple relaxes, it frequently does so in such a rapid manner that it forms tight clumps that resist untangling and thereby greatly interferes with the use of the staple blend coming from the carding machine inasmuch as it is not uniform and is difficult to spin into yarn having advantageous elastomeric textile properties. It is, therefore, unexpected that the use of aqueous sizing or coating compositions comprising the polymers of this invention provide means for overcoming such problems when used as explained above. Less desirably other coatings which constitute sizing or coating materials may in some instances also be used with generally less advantageous results or they may be included in a blended size or coating composition. These are available in the trade under such trade names as Elvanol sizing composition, Colloid sizing composition, Seycofilm sizing composition, Stymer sizing composition, etc., such commercially available sizes being prepared from polymers such as poly(vinyl alcohol), poly(acrylic acid), poly(vinyl acetate), the sodium salt of the copolymer of styrene and maleic anhydride, etc. Especially advantageous sizing or coating compositions in accordance with this use of the present invention comprise water-dissipated compositions containing the polymer identified hereinabove as Polymer X. Of course, Polymer X is merely typical and other polymers of this invention may also be similarly employed.

The invention has been described in detail with particular reference to preferred embodiments thereof, but it will be understood that variation and modifications can be effected within the spirit and scope of the invention as described hereinabove.

We claim:

1. An aqueous dissipation of a linear, water-dissipatable polymer having carbonyloxy linking groups in the linear molecular structure wherein up to 80% of the linking groups may be carbonylamido linking groups, the polymer having an inherent viscosity of at least about 0.1 measured in a 60/40 parts by weight solution of phenol/tetrachloroethane 25° C. and at a concentration of about 0.25 gram of polymer in 100 ml. of the solvent, the polymer containing substantially equimolar proportions of acid equivalents (100 mole percent), the polymer comprising the reaction products of (a), (b), (c) and (d) from the following components or ester forming or esteramide forming derivatives thereof;
   (a) at least one difunctional dicarboxylic acid;
   (b) from about 4 to about 25 mole percent, based on a total of all acid, hydroxyl and amino equivalents being equal to 200 mole percent, of at least one difunctional sulfo-monomer containing at least one metal sulfonate group attached to an aromatic nucleus wherein the functional groups are hydroxy, carboxyl or amino;
   (c) at least one difunctional reactants selected from a glycol or a mixture of a glycol and diamine having two —NRH groups, the glycol containing two —CH$_2$—OR groups of which at least 15 mole percent based on the total mole percent of hydroxy or hydroxy and amino equivalents, is a poly(ethylene glycol) having the structural formula:

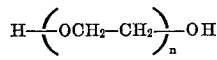

n being an integer of between 2 and about 20; and
   (d) from none to at least one difunctional reactant selected from a hydroxycarboxylic acid having one —CR$_2$—OH, an aminocarboxylic acid having one —NHR group, an amino-alcohol having one

group and one —NRH or mixtures thereof, wherein each R is an H atom or an alkyl group of 1 to 4 carbon atoms.

2. Aqueous dissipation of claim 1 wherein the linear, water-dissipatable polymer is a polyester having primarily carbonyloxy linking units in the linear molecular structure.

3. Aqueous dissipation of claim 2 wherein said difunctional sulfo-monomer (b) is a dicarboxylic acid and constitutes about 8 mole percent to about 50 mole percent based on the sum of all acid equivalents.

4. Aqueous dissipation of claim 2 wherein said difunctional sulfo-monomer (b) is a glycol and constitutes about 8 mole percent to about 50 mole percent based on the sum of all the hydroxy or hydroxy and amino equivalents;

5. Aqueous dissipation of claim 3 wherein said difunctional sulfo-monomer (b) is present as at least about 10 mole percent to about 50 mole percent.

6. Aqueous dissipation of claim 4 wherein said difunctional sulfo-monomer (b) is present as at least about 10 mole percent to about 50 mole percent.

7. Aqueous dissipation of claim 2 wherein said difunctional sulfo-monomer (b) is an aromatic dicarboxylic acid and the metal sulfonate group is attached to the aromatic nucleus thereof.

8. Aqueous dissipation of claim 7 wherein the metal of the sulfonate group is selected from the group consisting of Na, Li, K, Mg, Ca, Cu, Ni, Fe and mixtures thereof.

9. Aqueous dissipation of claim 2 wherein said difunctional sulfo-monomer (b) is isophthalic acid containing a metal sulfonate group attached to the aromatic ring.

10. Aqueous dissipation of claim 9 wherein said difunctional sulfo-monomer (b) is isophthalic acid containing a sodiosulfonate group.

11. Aqueous dissipation of claim 10 wherein said sodiosulfonate group is attached to the isophthalic acid in the 5-position.

12. Aqueous dissipation of claim 11 wherein the linear, water-dissipatable polyester comprises the reaction product of:
   (a) at least 80 mole percent isophthalic acid,
   (b) about 10 mole percent 5-sodiosulfoisophthalic acid, and
   (c) diethylene glycol.

13. Aqueous dissipation of claim 2 wherein the linear, water-dissipatable polyester comprises the reaction product of:
   (a) about 90 mole pecent isophthalic acid
   (b) about 10 mole percent 5-(p-sodiosulfophenoxy)-isophthalic acid, and
   (c) diethylene glycol.

14. Aqueous dissipation of claim 2 wherein the polyester comprises the reaction product of:
   (a) about 90 mole percent isophthalic acid,
   (b) about 10 mole percent 2-(2-sodiosulfophenyl)-2-ethylmalonic acid, and
   (c) diethylene glycol.

15. Aqueous dissipation of claim 11 wherein the polyester comprises the reaction product of:
   (a) about 50 mole percent isophthalic acid,
      about 25 mole percent terephthalic acid,
      about 15 mole percent hexahydroisophthalic acid;
   (b) about 10 mole percent 5-sodiosulfoisophthalic acid, and
   (c) diethylene glycol.

16. Aqueous dissipation of claim 2, wherein the polyester comprises the reaction product of;
   (a) about 50 mole percent isophthalic acid,
      about 25 mole percent terephthalic acid,
      about 15 mole percent hexahydroisophthalic acid,
   (b) about 10 mole percent 4-sodiosulfophenyl-3,5-dicarboxybenzene sulfonate, and
   (c) diethylene glycol.

17. Aqueous dissipation of claim 11 wherein the polyester comprises the reaction product of;
   (a) about 85 mole percent isophthalic acid
   (b) about 15 mole percent 5-sodiosulfoisophthalic acid, and
   (c) diethylene glycol.

18. Aqueous dissipation of claim 12 wherein the polyester comprises the reaction product of;
(a) about 90 mole percent isophthalic acid,
(b) about 10 mole percent 5-sodiosulfoisophthalic acid, and
(c) diethylene glycol.

19. Aqueous dissipation of claim 11 wherein component (a) is a mixture of terephthalic and adipic acid, component (b) is 5-sodiosulfoisophthalic acid which is about 10 mole percent based upon the sum of the acid equivalents and component (c) is diethylene glycol.

20. Aqueous dissipation of claim 11 wherein component (a) is at least 80 mole percent of adipic acid, component (b) is about 10 mole percent 5-sodiosulfoisophthalic acid and component (c) is diethylene glycol.

21. Aqueous dissipation of claim 11 wherein component (a) is isophthalic acid, component (b) is 5-sodiosulfoisophthalic acid, and component (c) is diethylene glycol, there being none of component (d).

22. Aqueous dissipation of claim 11 wherein component (a) is isophthalic acid, terephthalic acid, or mixtures thereof, component (b) is 5-sodiosulfoisophthalic acid, and component (b) is diethylene glycol.

23. An aqueous dissipation of a linear, water dissipatable polyester having an inherent viscosity of at least about 0.1, measured in a 60/40 parts by weight solution of phenol/tetrachloroethane at 25° C. and at a concentration of 0.25 gram of polyester in 100 ml. of the solvent, the polyester comprising the reaction products of following components or ester forming derivatives thereof;
(I) at least one difunctional glycol containing two aliphatic hydroxy groups of which at least 15 mole percent is a poly(ethylene glycol) having the structural formula:

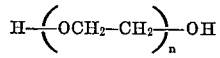

$n$ being an integer of about 2 to about 20; and
(II) at least two difunctional dicarboxylic acids of which from about 8 mole percent to about 50 mole percent is a difunctional sulfomonomer component containing at least one metal sulfonate group attached to an aromatic nucleus.

24. Aqueous dissipation of claim 11 wherein component (a) is terephthalic acid, component (b) is 5-sodiosulfoisophthalic acid, component (c) is diethylene glycol, and component (d) is 6-hydroxyhexanoic acid.

25. Aqueous dissipation of claim 1 wherein the linear, water-dissipatable polymer is a polyesteramide having from about 3% to about 80% carbonylamido linking units in the linear molecular structure.

26. Aqueous dissipation of claim 25, wherein the difunctional sulfo-monomer (b) is a dicarboxylic acid and constitutes about 8 mol percent to about 50 mole percent based on the sum of all acid equivalents.

27. Aqueous dissipation of claim 25 wherein said sulfomonomer (b) is a glycol and constitutes about 8 mole percent to about 50 mole percent based on the sum of all the hydroxy and amino equivalents.

28. Aqueous dissipation of claim 26 wherein said sulfo-monomer (b) constitutes from about 10 mole percent to about 50 mole percent based on the sum of all acid equivalents.

29. Aqueous dissipation of claim 26 wherein said difunctional sulfo-monomer is an aromatic dicarboxylic acid and the metal sulfonate group is attached to the aromatic nucleus thereof.

30. Aqueous dissipation of claim 29 wherein the metal of the sulfonate group is selected from the group consisting of Na, Li, K, Mg, Ca, Cu, Ni, Fe and mixtures thereof.

31. Aqueous dissipation of claim 26 wherein said difunctional sulfo-monomer is isophthalic acid containing a metal sulfonate group attached to the aromatic nucleus.

32. Aqueous dissipation of claim 31 wherein said difunctional sulfo-monomer is isophthalic acid containing a sodiosulfonate group.

33. Aqueous dissipation of claim 32 wherein said sodiosulfonate group is attached to the isophthalic acid in the 5-position.

34. Aqueous dissipation of claim 1 wherein the polymer has an inherent viscosity of at least about 0.3, the percentage of poly(ethylene glycol) in component (c) is at least about 20%, $n$ is an integer in the range from 2 to about 10 and each R is an H atom, methyl, ethyl, a propyl isomer or a butyl isomer.

35. The aqueous dissipation of claim 1 containing about 0.1 to about 50% by weight of polymer based on the weight of the polymer and the water added together.

36. Aqueous dissipation of claim 35 wherein the percentage range is about 20 to 35%.

37. The aqueous dissipation of claim 3 containing about 0.1 to about 50% by weight of polymer based on the weight of the polymer and the water added together.

38. The aqueous dissipation of claim 12 containing about 0.1 to about 50% by weight of polymer based on the weight of the polymer and the water added together.

39. The aqueous dissipation of claim 18 containing about 0.1 to about 50% by weight of polymer based on the weight of the polymer and the water added together.

40. The aqueous dissipation of claim 23 containing about 0.1 to about 50% by weight of polymer based on the weight of the polymer and the water added together.

References Cited

UNITED STATES PATENTS

| | | | |
|---|---|---|---|
| 3,557,039 | 1/1971 | McIntyre et al. | 260—29.2 |
| 3,092,597 | 6/1963 | Leech et al. | 260—29.2 |
| 3,222,299 | 12/1965 | MacDowell | 260—2.3 |
| 3,310,512 | 3/1967 | Curtice | 260—29.4 |
| 3,442,842 | 5/1969 | Bonin | 260—29.2 |

FOREIGN PATENTS

| | | | |
|---|---|---|---|
| 12,149 | 8/1962 | Japan | 260—75 S |

OTHER REFERENCES

Coney, Def. Pub. of Ser. No. 30,249, filed Apr. 20, 1970, published in O.G. on Mar. 9, 1971, Defensive Publication No. T884,004, 260—29.2.

WILLIAM H. SHORT, Primary Examiner

L. L. LEE, Assistant Examiner

U.S. Cl. X.R.

117—138.8 F, 155 R; 260—7.5, 16, 29.2 EP, 29.2 N, 40 R, 47 CZ, 75 S, 873

UNITED STATES PATENT OFFICE
CERTIFICATE OF CORRECTION

Patent No. 3,734,874                                     Dated May 22, 1973

Inventor(s) Charles J. Kibler, Gerald R. Lappin

It is certified that error appears in the above-identified patent and that said Letters Patent are hereby corrected as shown below:

Column 4, line 45, delete "1,3-cyclo" and insert ---1,3-cyclohexanebis-methylamine---.

Column 4, lines 60-65, delete the formula and insert

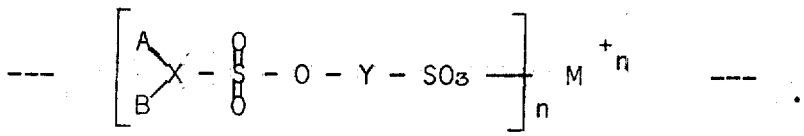

Column 6, line 1, (G), before "sodiosulfo-1-naphthyl-3,5-dicarbomethoxy" insert --- 6- ---.

Column 6, line 16, (I), before "sodiosulfophenyl-3,5-dicarbopropoxybenzene-sulfonate" insert --- 4- ---.

Column 6, line 22, (J), before "sodiosulfophenyl-3,5-dicarbobutoxy-benzenesulfonate", insert --- 4- ---.

Column 13, line 32, after "polyester" delete "of" and insert ---or---.

Column 13, line 52, delete "-$CH_2$-OH" and insert --- -$CR_2$-OH ---.

Table II, Polymer DD under "Dicarboxylic acid (mole percent of all monomers)" after "Sebacic" insert ---(30)---.

Column 15, delete lines 30 through 39.

Columns 15 and 16, Table III under "Polymer", delete the last two numbers (22 and 89) and insert ---28--- and ---29---.

Columns 17 and 18, Table III, Polymer No. 33, under the column "Diamine", delete "DODAD" and insert ---DADOD---.

CERTIFICATE OF CORRECTION

Patent No. 3,734,874    Dated May 22, 1973

Inventor(s) Charles J. Kibler, Gerald R. Lappin

It is certified that error appears in the above-identified patent and that said Letters Patent are hereby corrected as shown below:

- 2 -

Column 23, line 75, delete "fo" and insert ---of---.

Column 25, Claim 1, line 41, after "(100 mole percent)" insert ---to hydroxy and amino equivalents (100 mole percent)---.

Column 25, Claim 1, line 55, delete "-CH$_2$-OR" and insert --- -CR$_2$-OH---.

Column 25, Claim 1, line 66, delete "-NHR" and insert --- -NRH ---.

Column 26, Claim 13, line 43, delete "pecent" and insert ---percent---.

Signed and sealed this 20th day of November 1973.

(SEAL)
Attest:

EDWARD M. FLETCHER, JR.
Attesting Officer

RENE D. TEGTMEYER
Acting Commissioner of Patents